Dec. 30, 1924.
W. H. POTTHAST
TRAP
Filed July 27, 1922
1,521,474
2 Sheets-Sheet 2
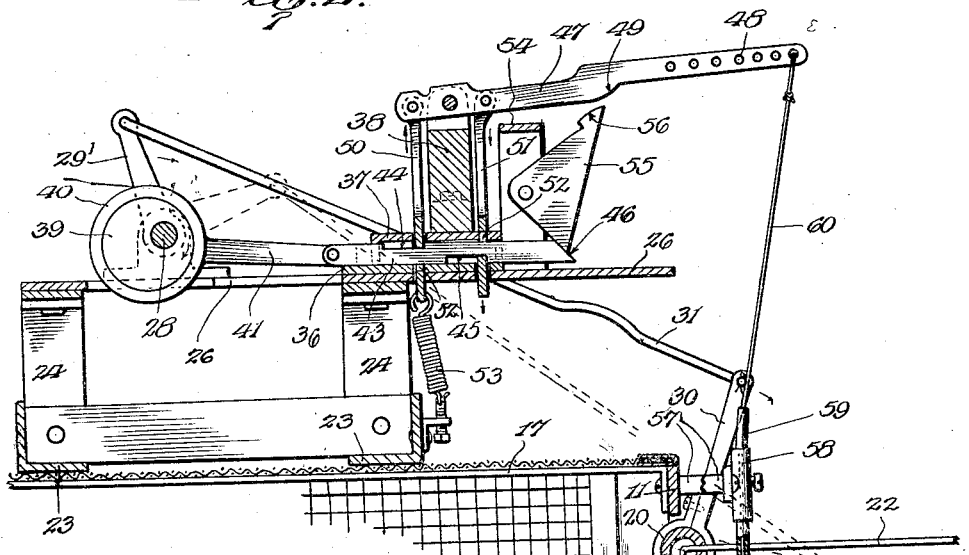
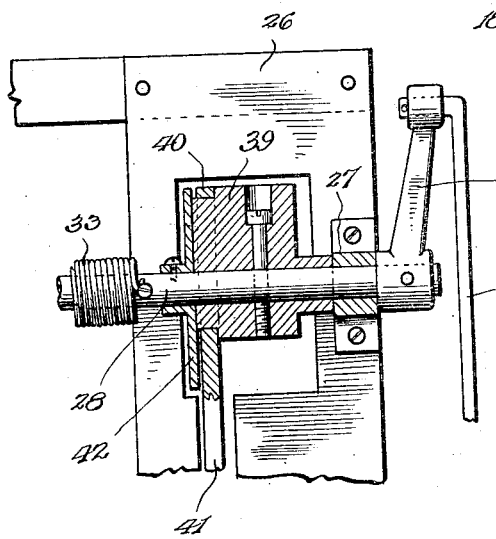
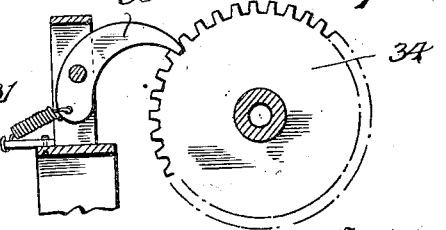
Inventor
W. H. Potthast.
By Lacey & Lacey, Attorneys Patented Dec. 30, 1924.

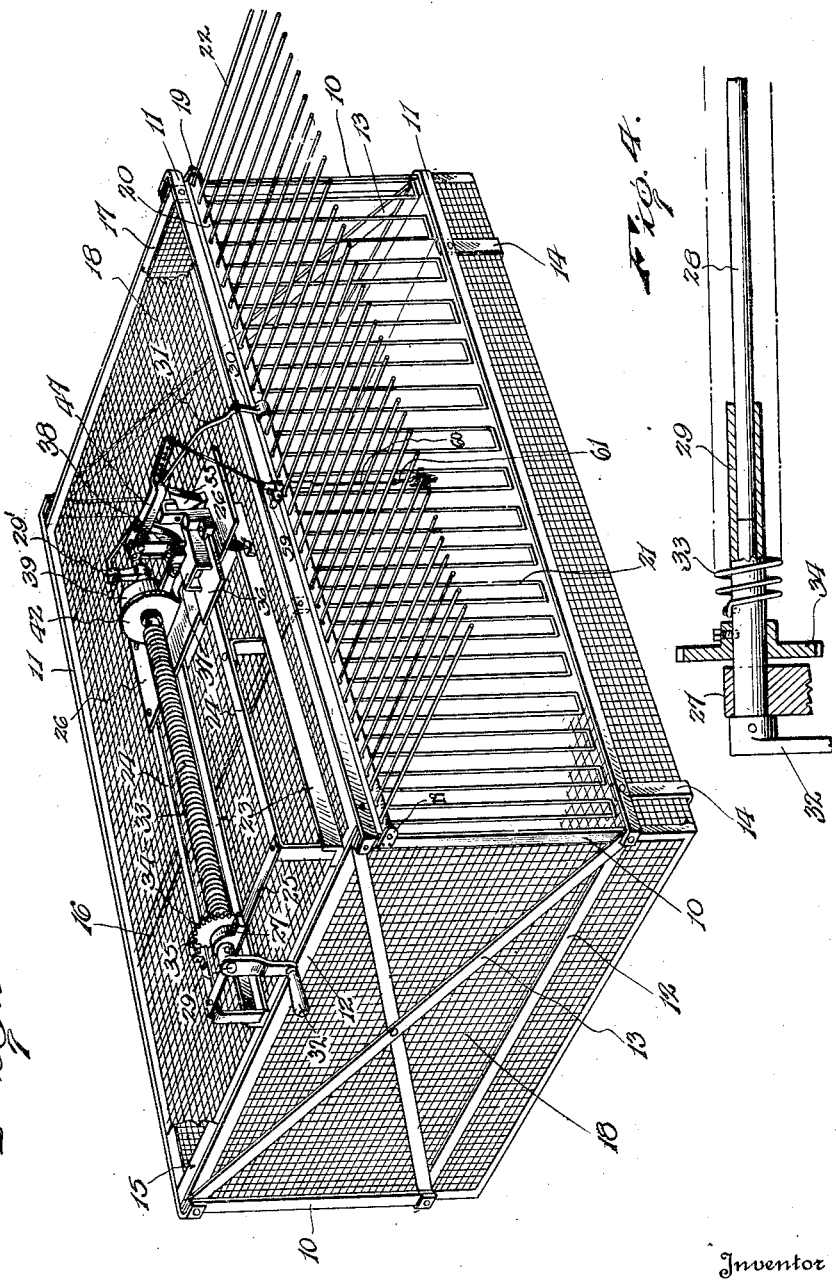

1,521,474

UNITED STATES PATENT OFFICE.

WALTER H. POTTHAST, OF MANNING, IOWA.

TRAP.

Application filed July 27, 1922. Serial No. 577,887.

*To all whom it may concern:*

Be it known that I, WALTER H. POTTHAST, a citizen of the United States, residing at Manning, in the county of Carroll and State of Iowa, have invented certain new and useful Improvements in Traps, of which the following is a specification.

This invention relates to an improved fish trap and seeks, as one of its principal objects, to provide a gate closed trap which will operate to catch a maximum number of fish at one setting of the trap.

The invention has as a further object to provide at trap embodying a spring actuated gate having angularly disposed wings one of which will normally close the trap while the other will be disposed to close behind a fish when the gate is opened for thus forcing the fish into the trap.

A further object of the invention is to provide a trap which may be suitably baited and wherein nibbling at the bait by a fish will serve to release the gate.

Another object of the invention is to provide a trap wherein the movement of the gate will be controlled step by step.

And the invention has as a still further object to provide a trap which, while being particularly adapted for catching fish will also be well adapted for catching animals.

Other and incidental objects will appear hereinafter.

In the drawings:

Figure 1 is a perspective view of my improved trap.

Figure 2 is a fragmentary vertical sectional view more particularly showing the trip mechanism of the trap.

Figure 3 is a fragmentary horizontal sectional view particularly showing the eccentric employed.

Figure 4 is a detail sectional view through the power shaft of the device, and

Figure 5 is a fragmentary sectional view showing the ratchet associated with the power shaft.

In carrying the invention into effect, I employ a cage including corner posts 10 between which extend upper and lower side bars 11 and upper and lower end bars 12. At each end of the cage are crossed brace bars 13 and extending between the lower side bars are bottom bars 14. Extending between the upper side bars are transverse brace bars which, for convenience, have been indicated at 15, 16, and 17 respectively, and appropriately secured to the several bars of the cage frame thus provided are preferably reticulate top, bottom, end and back walls 18, the cage being provided at its forward side with a gate opening extending throughout the length of the cage. Secured to the corner posts of the cage frame at the ends of said opening are brackets 19 and supported by said brackets is an oscillating gate. This gate includes a preferably tubular shaft 20 journaled at its ends by suitable trunnions upon the brackets and extending from the shaft, preferably at substantially right angles to each other, are wings 21 and 22 respectively, which may be formed of suitable lengths of wire passed through the shaft. As shown in Figure 1, the wing 21 normally closes the gate opening of the cage while the wing 22 extends forwardly with respect to the cage above said opening, the gate being movable to swing the wing 21 inwardly within the cage and close the wing 22 downwardly within the gate opening.

Mounted upon the cage is a frame supporting the actuating mechanism for the gate and associated parts. Said frame includes angle bars 23 secured to the cross braces 15 and 16 and mounted upon said angle bars are upstanding bars 24. Extending between the bars 24 at one end of the frame is a cross bar 25 and extending between the former bars at the other end of the frame is a plate 26 overhanging the frame. Mounted upon the bar 25 and said plate, as best shown in Figures 1 and 3, are appropriate bearings 27 journaling a power shaft which, as shown in Figure 4, is formed of telescopic rotatably connected sections 28 and 29 respectively. Mounted upon the shaft section 28 at its outer end is an arm 29' and fixed upon the shaft 20 of the gate is an arm 30. Extending between these arms is a rod 31 pivotally connected at its ends to said arms, the arm 30 being somewhat longer than the arm 29' to provide increased leverage. Mounted upon the outer end of the shaft section 29 is a crank 32 and encircling the shaft is a spring 33, one end of which is connected to the shaft section 28 while the opposite end of said spring is connected to the shaft section 29. The shaft section 29 also carries a ratchet wheel 34 and arranged to cooperate with said wheel is, as shown in Figure 5, a spring pressed pawl 35. Thus, the crank 32 may be turned for tensioning the spring 33.

Mounted upon the plate 26 is a wear plate 36 upon which rests a channel plate 37 and upstanding from the channel plate is a post 38 provided at its lower end with lugs through which are engaged bolts or other suitable fastening devices extending through the plates 26, 36 and 37 securing the post, channel plate and wear plate in position. Fixed to the shaft section 28, as best shown in Figure 3, is an eccentric 39 with which is engaged an eccentric strap 40 having an arm 41 extending therefrom, and secured to the shaft section to abut the adjacent end of the eccentric is a stop plate 42 retaining the strap upon the eccentric. Reciprocable through suitable notches in the side flanges of the channel plate 37 is a slide bar 43 resting upon the wear plate 36 and pivotally connected at its rear end to the arm 41 of the eccentric strap. Formed in the upper and lower sides of said bar are notches 44 and 45 while at its outer end the bar is provided with a beveled face 46. Pivotally mounted near its inner end upon the upper end of the post 38 is a trip lever 47 provided at its outer end with a series of openings 48 while at its lower side the lever is formed with a convex shoulder 49. Connected to the rear end of the lever at one side of the post 38 is a detent 50 and connected to the lever at the opposite side of the post is a companion detent 51. These detents are freely received through suitable slots in the plates 26, 36 and 37 and are provided with openings 52 accommodating the slide bar 43. Connected to the lower end of the detent 50 is a spring 53 pulling said detent downwardly to engage the forward end wall of the notch 44 in said bar and rock the forward end of the lever 47 upwardly for lifting the detent 51 to engage with the forward end wall of the notch 45. Thus, these detents will normally hold the bar 43 against movement under the tension of the spring 33. Mounted upon the plate 26 in front of the post 38 is a bracket 54 and pivoted upon said bracket is a dog 55 gravitating to rest at its lower edge against the beveled face 46 of the bar 43 and formed at its upper edge with a convex shoulder 56 to coact with the shoulder 49 of the lever. Extending from the upper side bar of the cage frame above the gate opening of the cage, are posts 57 mounting a clamp 58 and adjustably secured in said clamp is a guide tube 59. Secured through one of the openings 48 in the lever 47 is a cord or other suitable flexible element 60 which extends freely through the guide tube 59 and is equipped at its lower end with an appropriate hook 61 lying between the wings 21 and 22 of the gate.

In use, the crank 32 is first rotated to tension the spring 33 when said spring will act upon the shaft section 28 for normally holding the gate closed having the wing 21 thereof lying within the gate opening of the cage. Upon arranging a bait upon the hook 61, the trap will then be set. When the trap is thus set, it will be seen that downward pull upon the hook, as by nibbling of a fish upon the bait, will result in rocking the forward end of the trip lever 47 downwardly for depressing the detent 51 and elevating the detent 50 out of engagement with the bar 43. Accordingly, this bar will be released to free the shaft section 28 so that, as will be at once understood in view of the preceding description, the arm 29' will be rotated for rocking the gate. In this connection, it is to be noted that when the gate is closed, the eccentric 39 will pull rearwardly upon the bar 43, the bar being engaged by the detents 50 and 51 just short of the end of its rearward travel. Consequently, after the bar has been released by pull upon the trip lever 47, the bar will continue to the end of its rearward travel when, upon being shifted forwardly by the eccentric, the spring 53 will, under normal circumstances, serve to again engage the detents in the notches 44 and 45 of the bar. As will be observed, these notches are of a length to permit the bar to travel its full forward stroke after the spring 53 has engaged the detents in said notches as just noted, so that the bar will thus be permitted to travel forwardly and return to be again limited by the detents, the arm 29' having turned a full revolution. Thus, the shaft section 28 will be controlled to travel a full revolution step by step so that each time the trip member 47 is actuated the wing 21 of the gate will be rocked upwardly within the cage to open position, as shown in dotted lines in Figure 2, while the wing 22 of the gate will be rocked downwardly to close behind the fish nibbling at the bait upon the hook 61. The fish will accordingly be forced into the cage when, as the arm 29' continues to swing, the wing 21 of the gate will be returned to again close the cage while the wing 22 will be elevated to a position out of the way. As will be perceived, the closing of the wing 22 behind the fish will greatly enhance the possibility of the catch and since the spring 33, when tensioned, is adapted to revolve the shaft section 28 a considerable number of times, a quantity of fish may be caught at one setting of the trap. After the bar 43 has been released to effect actuation of the gate, the beveled face 46 of the bar will, as the bar travels forwardly, coact with the dog 55 for rocking the dog upwardly so that when the bar reaches the limit of its forward throw and the gate is fully open, the shoulder 56 of the dog will be caused to coact with the shoulder 49 of the trip lever for elevating the lever at its forward end and consequently returning the detents 50 and 51 to their normal position engaging in the notches 44 and 45 of the bar for limiting the bar in its rearward travel and consequently stopping the gate. Thus, the shaft section 28 cannot without being checked turn more than a complete revolution at each release thereof to once open and close the gate.

Having thus described the invention, what is claimed as new is:

1. A trap including a cage, an oscillating gate having wings disposed in fixed relation and diverging from the axis of oscillation, one wing normally closing the cage and the other wing extending behind the first wing, means mounted on the cage for oscillating the gate to open and close the cage, trip mechanism mounted on the cage adjacent the first-mentioned means and holding the same normally inactive, and a bait holder suspended from an element of the trip mechanism at a point above the gate and depending therefrom to a position between the wings of the gate, a pull on the bait holder causing the trip mechanism to release the first-mentioned means whereby to rock the gate.

2. A trap including a cage, an oscillating gate normally closing one side of the cage and including a rotatable shaft and wings fixed to the shaft and diverging from the axis of oscillation, a power shaft, means actuated by said shaft for oscillating the gate, a reciprocatory detent bar driven directly by the power shaft, trip mechanism cooperating with the reciprocatory detent bar to release and arrest the power shaft, and a bait holder associated with the trip mechanism.

3. A trap including a cage, an oscillating gate normally closing the cage, rotatable means for oscillating the gate, a reciprocable bar driven by said means, a pivoted trip lever, and companion detents carried by the lever to coact with the bar controlling the rotation of said means step by step.

4. A trap including a cage, an oscillating gate normally closing the cage, rotatable means for oscillating the gate, reciprocable means driven by the rotatable means, a pivoted trip lever, companion detents carried by the lever to coact with the reciprocable means for controlling the rotation of the first means step by step, and means operable by the second means to coact with the lever for returning the lever when tripped.

5. A trap including a cage, an oscillating gate normally closing the cage, rotatable means for oscillating the gate, a reciprocable bar driven by said means, a pivoted trip lever, companion detents carried by the lever to coact with said bar and control rotation of said means step by step, and a pivoted dog operable by the bar to coact with the lever for returning the lever when tripped.

6. A trap including a cage, a gate controlling the opening and closing of the cage, a power shaft, an operative connection between said shaft and the gate for shifting the gate upon release of the shaft, an eccentric carried by the power shaft, a reciprocating detent bar driven directly by said eccentric, and trip mechanism associated with said detent bar for arresting and releasing the shaft.

7. A trap including a cage having an open front, a gate adapted to close the open front of the cage, a power device mounted on the cage and operatively connected with the gate to move the latter to open position, means operable simultaneously with the gate to push an animal through the open front of the cage, a detent bar slidably mounted on the cage and operated positively by the power device, a trip lever mounted above the detent bar, a bait holder suspended on the trip lever and depending therefrom to a position adjacent the gate, means associated with the trip lever for normally engaging the detent bar and preventing operation of the power device, said means being releasable by a pull on the bait holder, and means for yieldably holding the last-mentioned means in normal position.

8. A trap including a cage having an open front, a gate adapted to close the open front of the cage, a power device mounted on the cage and operatively connected with the gate to move the latter to open position, means operable simultaneously with the gate to push an animal through the open front of the cage, a detent bar slidably mounted on the cage and operated positively by the power device, a trip lever mounted above the detent bar, a bait holder suspended on the trip lever and depending therefrom to a position adjacent the gate, means associated with the trip lever for normally engaging the detent bar and preventing operation of the power device, said means being releasable by a pull on the bait holder, means for yieldably holding the trip lever and the means associated therewith in normal position, and a dog mounted between the detent bar and the trip lever for rocking movement, the lower end of the dog being in engagement with the forward end of the detent bar and its upper end being in the path of the detent lever and adjacent the lower side of the same.

In testimony whereof I affix my signature.

WALTER H. POTTHAST. [L. S.]